United States Patent [19]

Anderson

[11] Patent Number: 4,750,340
[45] Date of Patent: Jun. 14, 1988

[54] APPARATUS FOR TREATING A FIBRE SUSPENSION

[75] Inventor: Jan L. E. Anderson, Karlstad, Sweden

[73] Assignee: Kamyr AB, Karlstad, Sweden

[21] Appl. No.: 924,928

[22] Filed: Oct. 30, 1986

[30] Foreign Application Priority Data

Oct. 31, 1985 [SE] Sweden ................................ 8505140

[51] Int. Cl.⁴ ........................... D21C 9/06; D21F 1/60; B01D 33/06
[52] U.S. Cl. ...................................... 68/43; 68/181 R; 162/60; 162/210; 162/329; 210/217; 210/402; 210/772; 100/121
[58] Field of Search ................. 162/60, 210, 317, 318, 162/321, 323, 329, 380; 210/217, 402, 772; 68/43, 22 R, 181 R; 100/121

[56] References Cited

U.S. PATENT DOCUMENTS

| | | | |
|---|---|---|---|
| 2,005,839 | 6/1935 | Edge | 162/329 |
| 2,189,518 | 2/1940 | Gschwender | 162/328 |
| 3,616,660 | 11/1971 | Ingermarsson | 162/317 |
| 3,772,144 | 11/1973 | Luthi et al. | 162/210 |
| 4,085,003 | 4/1978 | Luthi | 162/259 |
| 4,559,104 | 12/1985 | Eriksson | 162/336 |

FOREIGN PATENT DOCUMENTS 1063523 2/1979 Canada .
318183 12/1969 Sweden .
7316985-6 9/1975 Sweden .
7204194-0 2/1977 Sweden .
7802937-8 1/1986 Sweden .

Primary Examiner—David L. Lacey
Assistant Examiner—K. M. Hastings
Attorney, Agent, or Firm—Nixon & Vanderhye

[57] ABSTRACT

An apparatus for treating a fiber suspension, comprises a drum rotatably journalled to a stand and having an envelope surface to support a fiber web formed from the fiber suspension. A curved wall plate which is concave in the direction to the envelope surface of the drum is spaced from the envelope surface (and generally parallel thereto) to define a material space therebetween for said fiber web. The space includes an axial inlet gap and an axial outlet gap. The wall is continuous and encloses a major portion of the envelope surface of the drum and is arranged to move freely in the circumferential direction of the drum to compensate for radial alterations during adjustment of the distance of the wall from the envelope surface at one or more positions between the inlet gap and outlet gap. Adjustment devices cooperate with the wall for adjusting the distance of the wall from the envelope surface of the drum. A support is joined to the stand for carrying the adjustment devices, each of the adjustment devices acting on and influencing a section, and only a section, of the wall and comprising a connection element positioned at the outer surface of the wall within the wall section.

14 Claims, 3 Drawing Sheets

APPARATUS FOR TREATING A FIBRE SUSPENSION

The present invention relates to an apparatus for treating a fibre suspension comprising a drum rotatably journalled by a horizontal shaft to a stand and having an envelope surface to support a fibre web formed from the fibre suspension; a wall means, which is concave in the direction to the envelope surface of the drum and extends at a distance from the envelope surface to define a material space therebetween for said fibre web having an axial inlet gap and in the circumference direction at a distance therefrom an axial outlet gap; means cooperating with the wall means for adjusting the distance of the wall means from the envelope surface of the drum; and a support means joined to the stand for carrying the adjustment means, each of the adjustment means being influencing a section of the wall means and comprising a connection element positioned at the outer surface of the wall means within said section.

SE No. 378 433 describes an apparatus for continuously separating suspension liquid from a fibre suspension fed through a fibre-separating space which is defined by the envelope surface of a rotatable drum and the envelope surface of a vessel surrounding the drum, the radial distance between drum and vessel envelope surfaces decreasing in the direction of rotation of the drum. At the outlet of the liquid-separating space to the fibre-separating space is a throttle plate which is radially adjustable in relation to the drum by means of a pivoting movement. The liquid separation is adjusted by altering the radial distance of the liquid-separating space between said two envelope surfaces with the aid of the throttle plate, and at the same time adjusting the speed of the drum and the flow quantity of filtrate. The radial distance can therefore only be altered in a very small portion of the liquid-separating space, said portion being determined by the length of the pivotable throttle plate.

SE No. 318 183 describes an apparatus for washing a continuously running web produced from a cellulose fibre suspension between a rotatable drum and a wire, two perforated pressure elements being mounted to exert pressure on the wire in the direction to the drum by means of pressure devices. The pressure elements are pivotably connected by a joint and each is surrounded by a hood. One of the pressure elements is pivotably mounted in a zone for removing spent liquor and forms a space, narrowing in the direction of feed, between drum and wire. The shape of the space can be altered by means of the pressure devices. The dryness content of the fibre web is gradually increased by suitably pressing the last-mentioned pivotable pressure element by means of the pressure device.

SE No. 391 356 relates to an apparatus for treating a fibre suspension in which two unperforated pressure screens extend between an outer vessel wall and the drum, each pressure screen being pivotably journalled at one end enabling it to be swung between drum and vessel wall so that a narrowing space is formed and maintained between pressure screen and drum. The pressure screen is pivoted by actuating means and each screen is provided with a plurality of reinforcing ribs.

SE No. 7802937-8 describes a washing apparatus for washing cellulose fibres, in which a perforated drum rotates in a container to form a fibre web from a fibre suspension which is supplied to the container from a headbox. A thin compression screen is mounted in the container, which is caused by operating means to exert a compressive force on the fibre web, both in a forming zone and in a subsequent compression zone The screen can be bent at a line located at the transition between the forming zone and the compression zone. The screen may either be provided with two reinforcing strips, breaken at said line, or it may comprise two parts hinged together at said line.

The known pressure elements and pressure screens described in the above-mentioned patent specifications constitute inner wall means which do not permit individual alteration of the radial distance between themselves and the drum within several sections located one after the other in the direction of rotation of the drum. The inner wall means can only surround a small part, i.e. less than 50% of the circumference of the drum, and cannot themselves be utilized to form the defining wall of a vessel outside the envelope surface of the drum. The shape and location of the known wall means in a vessel allow only small quantities of liquid to be pressed out of the fibre web.

U.S. Pat. No. 2,005,839 discloses a cylinder machine having a flexible wall mounted beneath the cylinder mould to form a narrowing space therebetween for receiving the stock. The wall has upon its outer surface a series of brackets for connecting adjustment means comprising horizontal eccentrically operated rods by which the distance between the wall and mould can be adjusted. However, the eccentric adjustment means are designed and arranged in such a way that only a very limited displacement of the wall can be obtained in the circumference direction of the mould when the radius of the wall is altered. Because of the fact that the wall cannot move freely during an adjustment operation this known arrangement cannot be used for a wall which encloses a main portion of a mould or drum. Furthermore, the wall can move in said circumference direction also during operation of the cylinder machine. In particular when a higher pressure will be acting on the wall sections of the wall between the adjustment means will be urged outwardly in a manner not desired. This arrangement cannot therefore be used for those treatments where the flexible wall is exerted by high pressure via a compressed fibre web, such as in dewatering a fibre web. In such applications using high pressure it is required that the material space is not unintentionally altered during operation.

The object of the present invention is to eliminate the problems mentioned above in providing an apparatus for treating a fiber suspension. The apparatus of the invention has a wall means with a considerably longer extension than previously so as to enclose as large a part of the drum as is practically possible, the only limitaion being that sufficient space is left for connections to the inlet for the fiber suspension and the outlet for the fiber web. This enables substantially higher dryness contents to be achieved in the fiber web than have been achieved with the known apparatus for the same purpose. The wall means is continuous and encloses a major portion of the envelope surface of the drum (e.g. at least 270°, preferably at least 300°) and is arranged to move freely in the circumferential dimension of the drum to compensate for radial alterations during adjustment of the spacing of the wall means from the envelope surface of the drum at one or more positions between the inlet gap and outlet gap.

DETAILED DESCRIPTION

Figure 1:
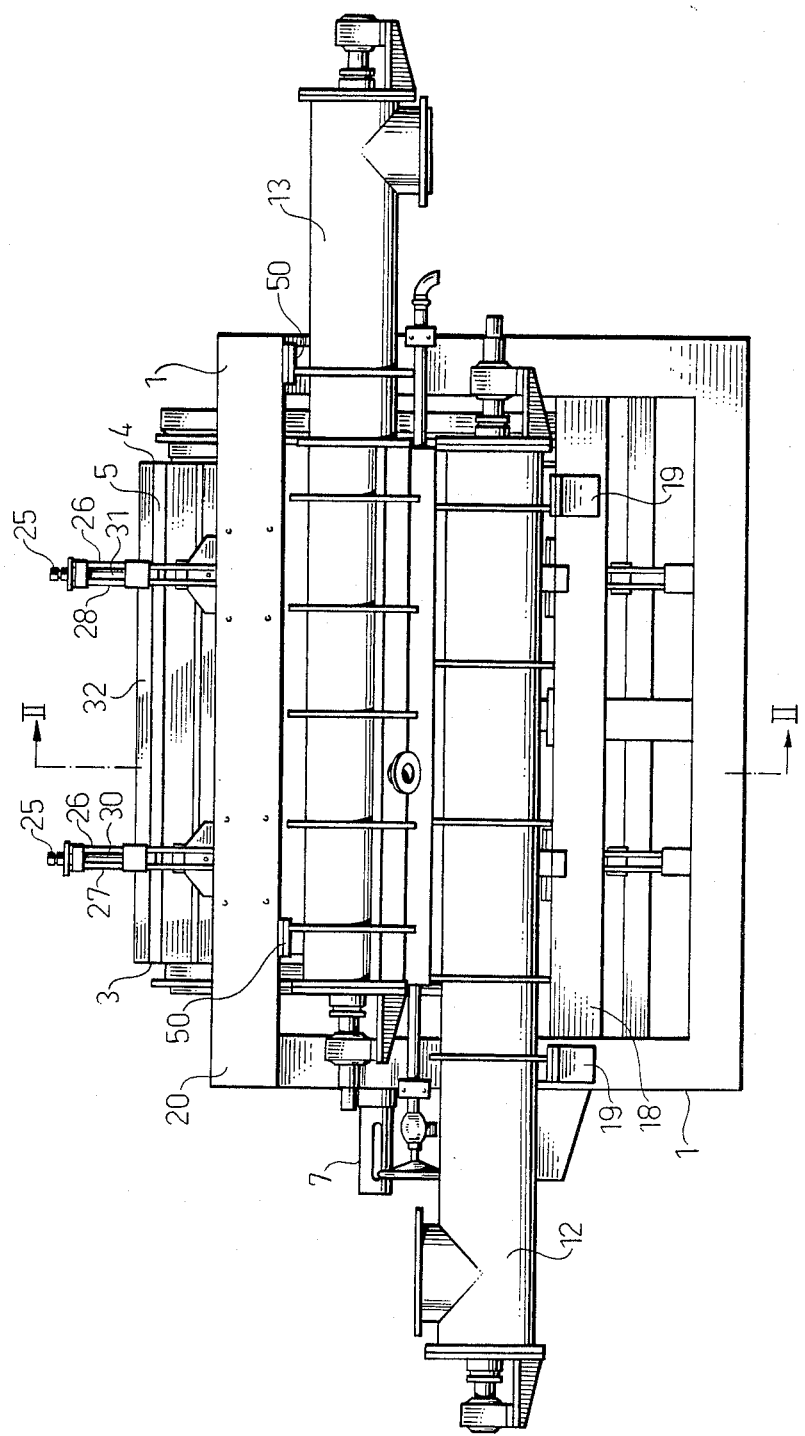
FIG. 1 is a front elevation view of an exemplary apparatus for treating a fiber suspension according to the present invention.
Figure 2:
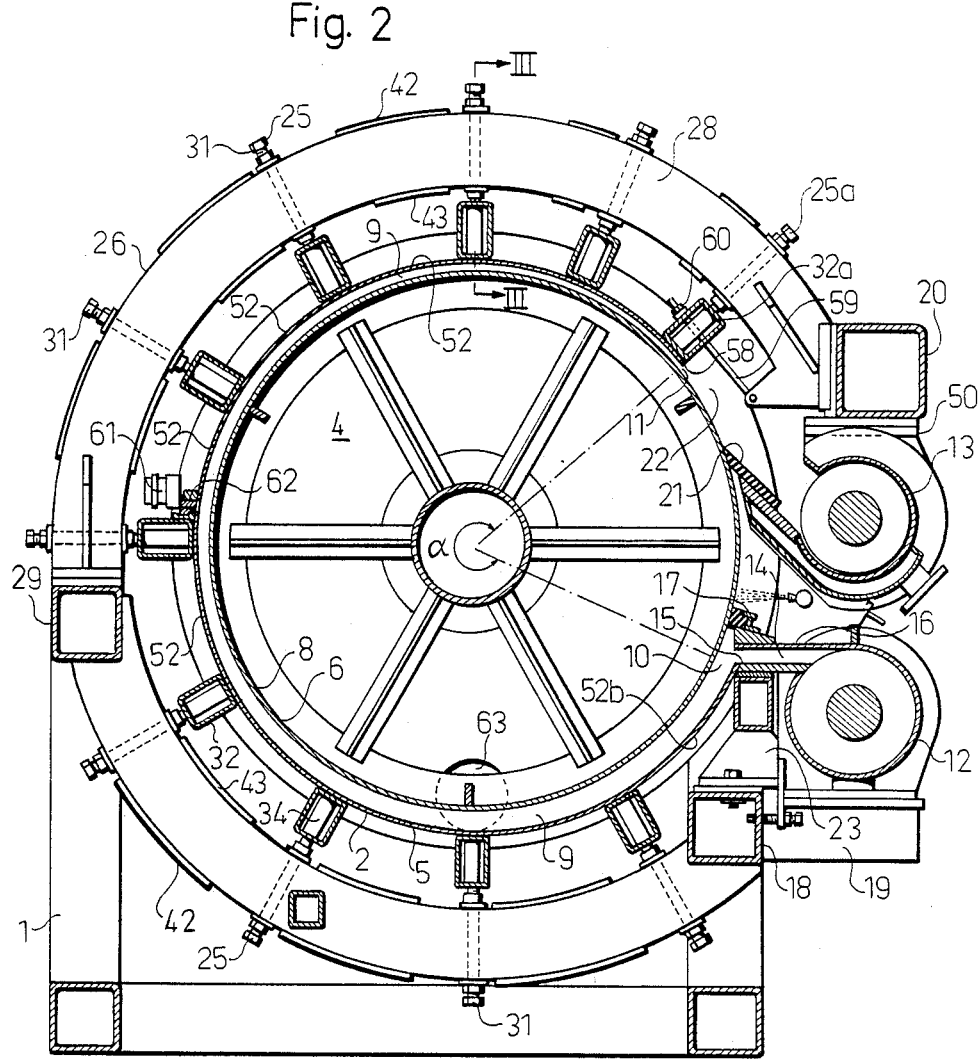
FIG. 2 is a cross-sectional view of the apparatus in FIG. 1 taken along the lines 11—11 thereof.
Figure 3:
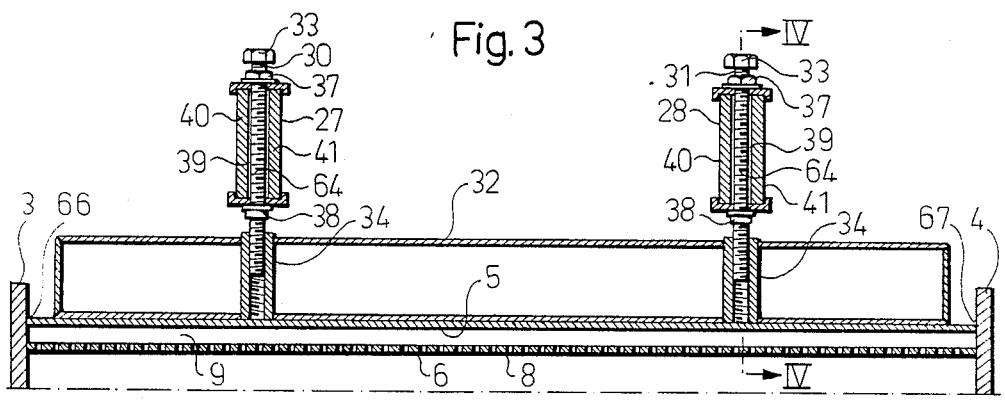
FIG. 3 is a sectional view along lines III—III in FIG. 2 and shows one of the adjustment means of the apparatus.
Figure 4:
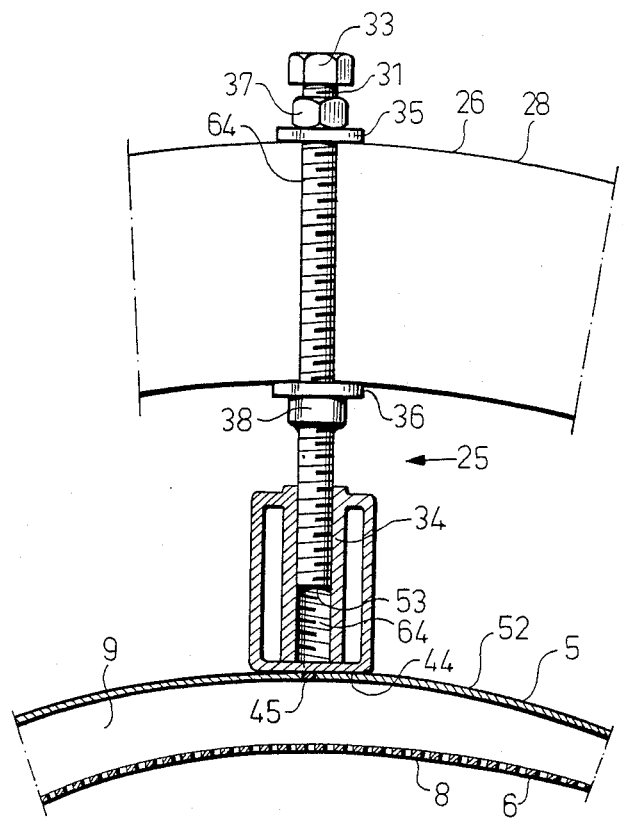
FIG. 4 is a cross-sectional view of the adjustment means taken along the line IV—IV in FIG. 3.

With reference to FIGS. 1 and 2 it is shown therein an apparatus comprising a stand 1, a continuous wall means 5 which together with side limitations form a trough or vessel 2, and a drum 6 rotating in the vessel 2. The drum 6 is rotatably journalled in the stand 1 by means of a horizontal shaft 7, the drum 6 being closed at its ends by gables 3, 4 which are somewhat larger than the cross-sectional area of the drum so as to form said side limitations of the vessel 2, as will be seen from FIG. 3. The drum 6 is provided with a cylindrical, liquid-permeable envelope surface 8 comprising a rigid, perforated metal sheet (for the sake of simplicity the perforations have been omitted in FIG. 2—see FIGS. 3 and 4) and one or more wires (not shown) surrounding the metal sheet. The wall means consists of a flexible wall plate which is concave in the direction towards the envelope surface 8. The continuous wall plate 5 encloses a main portion of the envelope surface 8 of the drum 6 and extends along the envelope surface 8 and spaced from this to form an arc-shaped material space 9 therebetween for a fibre web being formed from a fibre suspension fed in via an elongate horizontal and axial inlet gap 10 (FIG. 2). The fibre web leaves the material space 9 via an elongate horizontal and axial outlet gap 11. Thus, the inlet gap 10 and outlet gap 11 lie parallel to the shaft 7 of the drum 6 and, like the entire material space 9, extend between the two gables 3, 4 of the vessel 2. The gables 3, 4 thus rotate together with the envelope surface 8 of the drum while they are in gliding sealing contact with the curved wall plate 5 of the vessel 2 along its parallel side edges 66, 67, preventing liquid from leaking out from the material space 9 at the sliding surfaces between the wall plate 5 and gables 3, 4 (FIG. 3). The liquid flowing through the envelope surface 8 of the drum is removed through an outlet 63.

The apparatus also includes a supply means in the form of an elongate supply screw 12 and a discharge means in the form of an elongate discharge screw 13. The screws 12, 13 are mounted parallel to the shaft 7 of the drum and along one longitudinal side of the apparatus where the drum 6 is exposed in that the wall plate 5 of the vessel 2 has a limited length around the drum 6 in order to enclose a predetermined, larger portion of the drum, while forming said inlet and outlet gaps 10, 11. The supply screw 12 is thus mounted close to the inlet gap 10 of the material space 9 and communicates therewith via a horizontal inlet channel 14 having the same width as the inlet gap (seen in the longitudinal direction of the drum) and being defined by a bottom plate 15 and a top plate 16 with a sealing strip 17 in contact with the envelope surface 8 of the drum.

Figure 5:
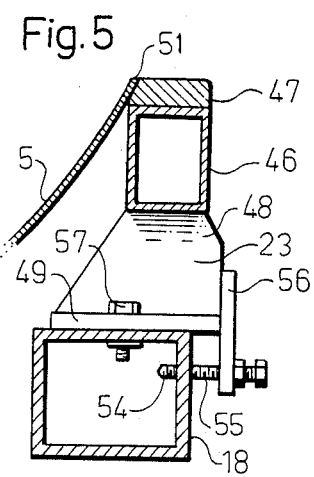
FIG. 5 shows a special support means for setting an inlet gap in the apparatus in accordance with FIG. 1.

The supply screw 12 is supported by a lower, horizontal beam 18 of the stand 1, via brackets 19. The discharge screw 13 is supported by an upper horizontal beam 20 of the stand 1, via brackets 50. The discharge screw 13 is provided with a doctor blade 21 being in contact with the envelope surface 8 of the drum to scrape the fibre web off the envelope surface when it reaches the expanded or free space 22 immediately after the outlet gap 11 of the material space. The fibre web is then fed into the discharge screw 13. The bottom plate 15 of the inlet channel 14 is carried by a support means 23 below, to which the upstream edge 51 of the wall plate 5 is secured (FIG. 5). The supply screw 12 is preferably constructed as described in U.S. Pat. No. 4,559,104.

The apparatus comprises a plurality of adjustment means 25, connected to the wall plate 5 to enable adjustment of the material space 9. The curvature or radius of the wall plate can be altered and adjusted individually within a plurality of sections 52, one adjustment means 25 influencing each section. Each section 52 is defined laterally by corresponding portions of the parallel side edges 66, 67 of the wall plate 5, and extends in the direction of curvature of the concave wall plate, the transition between the sections being continuous.

The apparatus comprises specific support means 26 to carry the adjustment means 25, which in turn carry the wall plate 5. In the embodiment shown the support means 26 consists of two spiral-arc shaped elements 27, 28 having equal radii, each stationarily arranged in its own vertical plane. The arc elements 27, 28 are located in a path eccentric with the envelope surface 8 of the drum and at a predetermined distance from the wall plate 5, enclosing most of this. The arc elements 27, 28 are substantially C-shaped and they are secured at each end to the horizontal beam 18, 20 of the stand and at their inner, or substantially central parts to another horizontal beam 29 of the stand 1 where each arc element is suitably divided into two parts, as will be seen from FIG. 2, to facilitate assembly. In an alternative embodiment (not shown), the apparatus is provided with only one such or similar arc-element. This is particularly useful for drums which are not too long. Instead of spiral-arc shaped elements circle-arc shaped elements can be used which are placed in a path concentric with the envelope surface of the drum.

The adjustment means 25 are arranged to be locked or secured to the arc elements 27, 28, and the radial distance set between the envelope surface 8 of the drum and the wall means 5 can then be maintained within each portion of the material space 9 corresponding to a section 52 of the wall means 5. If this distance is to be altered within one or more sections 52, the adjustment means 25 is detached from the arc element 27, 28, allowing the wall plate 5 free movement both radially in relation to the drum 6 and in its direction of curvature. The wall plate 5 formed and carried in this way is thus also arranged in slidable sealing contact with the insides of the two gables 3, 4 of the vessel 2, as described above. The wall means 5 is of uniform thickness and sufficient strength to withstand pressure internally from the fibre suspension and the fibre web at the places between two adjacent connection elements 32, without becoming permanently deformed, while having sufficient elasticity to be shaped to uniform curvature with greater or smaller radius when influenced by the adjustment means 25.

Each section 52 within which the curvature or radius of the wall plate 5 can be individually altered, is provided with an adjustment means 25. In the embodiment shown this consists of two setting devices 30, 31 and an elongate, rigid connecting element in the form of a horizontal connection beam 32 secured to the outside of the wall plate 5 and extending parallel to the shaft 7 of the drum 6 between the side edges 66, 67 of the wall plate 5. Each setting device 30, 31 comprises a setting bolt 64 with respect to the drum. The heads 33 of the two setting bolts 64 located side by side are thus easily accessible outside the arc elements 27, 28 and extend freely therethrough, i.e. with no screw thread or other friction engagement. Furthermore, each setting device 30, 31 includes a locking means to detachably secure the adjustment means 25 to the support means 26. As will be seen from FIGS. 3 and 4, each setting bolt 64 is screwed into an internally threaded sleeve 34 rigidly mounted in the connection beam 32. Each setting bolt 64 is provided with outer and inner washers 35, 36 and comprises a locking means consisting of a locking nut 37 and a stationary shoulder 38, said locking nut 37 being located outside the outer washer 35. The washer 35, 36 abut the outside and inner sides, respectively, of the arc element 27, 28 to provide support against them. The stationary shoulder 38 is rigidly secured, by welding for instance, to a forward portion of the setting bolt 64, located between the arc element 27, 28 and the connection beam 32, at a suitable distance from the "free" end 53 of the setting bolt 64, said distance being suitably at least as great as the depth of the hole 65 of the sleeve 34 to enable the full extent of the screw engagement to be utilized. Each arc element 27, 28 is provided with a radial through-opening 39 (FIG. 3) for each setting bolt 64, the opening 39 having such width and extension in the longitudinal direction of the arc element that the setting bolt 64 can move freely the required distance in clockwise or counter-clockwise direction in the longitudinal direction of the arc element, depending on the adjustment of the wall plate 5 which is intended to be performed within one or more sections 52. Such a free movement is thus only possible when the setting bolts 64 have been released or detached from the arc element 27, 28 by detaching and unscrewing the locking nuts 37 in the direction away from their shoulders 38. In the embodiment shown, the radial through-openings 39 are obtained by assembling each arc element 27, 28 out of two relatively thin arc-shaped plates 40, 41 mounted at a predetermined distance from each other and rigidly joined together by a plurality of outer and inner cross pieces 42, 43, said predetermined distance being somewhat greater than the diameter of the setting bolts 64 in order to avoid friction engagement.

In order to maintain the desired radius for the wall plate 5 also within the connection beam 32 of each section 52, this is secured to the wall member 5 only along a straight line, this line suitably corresponding to the centre line of the inner surface 44 of the connection beam 32. A suitable number of spot welds 45 are performed along this line to give a strong joint between the wall member 5 and the connection beam 32. This ensures that even the parts of the wall plate 5 located immediately opposite said inner surface 44 and on both sides of the line of spot welds 45 will be free to bend upon radial displacement of the wall plate 5 in a direction towards or away from the envelope surface 8 of the drum.

The inlet gap 10 may be set at a suitable value to start with, i.e. determined for a certain operating condition of the apparatus. In the embodiment shown the inlet gap 10 is adjustable in an advantageous way so that the radial distance between wall plate 5 and the envelope surface 8 of the drum at the edge end 51 can be increased or decreased to a value adapted to each particular operating condition. As will be seen from FIG. 5, the wall plate 5 is rigidly mounted to a horizontal beam 46 of the support means 23 by means of a connection plate 47 on which the bottom plate 15 of the inlet channel 14 freely rests in sliding, sealing contact. The support means 23 is provided with two legs 48 spaced apart, which support the beam 46 and rest on the beam 18 of the stand 1. The support means 23 with its legs 48 can be moved horizontally towards or away from the envelope surface 8 of the drum, thus achieving a corresponding alteration in the radial distance of the inlet gap 10. The legs 48 are provided with horizontal foot plates 49 which slide on the beam 18 of stand 1. Movement to the left as seen in FIGS. 1 and 5 is thus effected by screwing in a first bolt 54 in the beam 18 (only the free end of the bolt 54 can be seen in FIG. 5), whereas movement in the opposite direction is effected by a second bolt 55, the free end of which rests against the vertical outer surface of the beam 18. The first bolt 54 is thus screwed a little way out before the second bolt 55 is screwed into a vertical support 56 through which the bolt 54 passes freely. When movement is complete, each leg 48 is locked to the beam 18 by one or more locking bolts 57, each passed through an elongate opening (not shown) in the beam 18, said opening being perpendicular to the beam 18 so as to permit movement of the support means 23 when the locking bolt 57 has been loosened. The desired set radial value of the inlet gap 10 is thus maintained by said locking. The connection plate 47 is in sliding contact with the bottom plate 15 during said displacements.

The connection beam 32a of section 52a (FIG. 2) nearest the outlet gap 11 is located close to the downstream end edge 58 of the wall plate 5. The adjustment means 25a located furthest downstream thus determines the amplitude of the outlet gap 11. A tension device is mounted between each arc element 27, 28 and the connection beam 32a of the adjustment means 25a located furthest downstream. According to the embodiment shown, each tension device comprises a threaded rod 59 secured at one end portion to the arc element 27, 28, the other end portion being passed through a hole in the connection beam 32a to carry a tension nut 60. When the two tension nuts 60 are screwed in on the rods 49, a corresponding tensile force results in the wall plate 5. This tensile force is utilized to assist in moving the wall plate 5 in the direction of rotation of the drum to compensate for reduced radius in the wall plate 5 within one or more sections seen from section 52a located furthest downstream. The corresponding locking nuts 37 has been loosened earlier to release the setting bolts 64, allowing them to follow the movement of the wall plate 5. If the radius of the wall plate 5 is to be increased within one or more sections 52, the tension nuts 60 are loosened, thus removing the tensile force. When the wall plate 5 is to be adjusted, usually all locking nuts 37 and possibly also the tension nuts 60 are loosened, depending on the pattern of the alteration in radius and the work of setting the radial distance between envelope surface 8 of the drum and wall plate 5 commences at section 52b located nearest inlet gap 10, assuming that the inlet gap 10 itself is not to be adjusted also. Otherwise this would be the first measure. The radial distance is then adjusted section by section seen in the direction of rotation of the drum 6. The two locking nuts 37 are tightened as soon as an adjustment has been performed with the two setting bolts 64 of the actual adjustment means. Alternatively the tension device comprises hydraulic or pneumatic members.

The apparatus described above has thus the specific feature that the wall plate 5 is free to move in the circumference direction of the drum for compensation of radius alterations in connection with each adjustment of the distance of the wall plate 5 from the envelope surface 8 of the drum at one or more positions between the inlet gap 10 and the outlet gap 11.

The apparatus shown also comprises a liquid discharger 61 for the supply of treatment liquid to the fibre web moving past the discharger 61. The discharger 61 is provided with a plurality of liquid flow channels having orifice portions formed in nozzles 62. In the embodiment shown the nozzles are arranged in a row transverse to the fibre web. Several such rows of nozzles may alternatively be arranged, the nozzles in the first row being offset in relation to the nozzles in the second row. Depending on field of application, the apparatus may be provided with a plurality of such liquid dischargers 61.

In the embodiment shown the wall plate 5 encloses a main portion of the envelope surface of the drum, that is to say a sector angle α of about 295°, and the wall plate 5 is adjusted and secured by means of the adjustment means 25 so that the material space 9 has a uniformly converging course from inlet gap 10 to outlet gap 11. By special measurements, such as changes of the discharge means 13, for instance, the wall plate may be extended further up to a sector angle α of about 340°, for instance. The inlet gap 10 is suitably adjustable allowing said radial distance at the inlet gap 10 to be adjusted in the range of 15–50 mm, for instance, and at the outlet gap 11 in the range of 1–15 mm, for instance. The radial distance may alternatively vary within different portions of the material space 9, the distance, for instance, being constant within at least one portion, followed by a converging or diverging distance within at least one other portion, the last portion preferably converging to form a pressure portion at the outlet. This possibility of varying the said distance in the direction of rotation of the drum makes the invention particularly advantageous since the apparatus can be used for several different types of treatments and operating conditions. Moreover, the invention enables liquid dischargers to be utilized advantageously, these being mounted in the wall plate 5 within one or more treatment zones so that a number of requirements for different types of liquid treatments can be fulfilled in a simple and efficient manner.

The distance between two adjustment means may vary, decreasing towards the outlet gap since the wall plate will be exerting an increased pressure on the fibre web the closer it comes to the outlet gap. The distance between two adjacent adjustment means may generally be such that, measured along the line of spot welds on the connection beams 32, the adjustment means enclose a sector angle of the drum of approximately 10°–50°, preferably 20°–40°.

The apparatus according to the invention can be utilized to treat different types of fibre suspensions, preferably vegetable fiber suspensions, and liquid dischargers 61 may be mounted as required for adding treatment liquid for washing or as replacement liquid, for instance, containing suitable chemicals for treatment. The apparatus can be designed as a drum filter, such as a pressure filter, auto-suction filter or suction filter, where washing or other liquid treatment is performed by means of liquid dischargers mounted in the wall plate. Said wall plate then also has a pressing function in order to compress the fibre web, displace liquid and increase the fibre concentration of the fibre web being discharged. The apparatus according to the invention can also be constructed as a washing press in which a press roll is used for final compression of the fibre web.

According to a further alternative embodiment of the support means, the arc elements 27, 28 are replaced by two cross beams, each extending for instance over a connection beam 32, parallel thereto, and movably journalled at the ends to fixed supports. In this case the setting bolts are only axially movable in holes in the cross beams when their locking means have been loosened. Instead the cross beams are movable along the direction of the circumference of the drum to achieve displacement of the setting bolts to compensate for alterations in the extension of the wall plate 5 upon alteration of its curvature or radii in several sections. Alternatively the setting bolts may be fixed in the cross beams. In this case the beams are also radially movable in relation to the drum to effect said alteration in curvature or radius within a section of the wall plate.

According to an alternative embodiment of the setting devices and their location, the setting bolts are only pivotably journalled in the connection beams, in which case they are instead in screw engagement with sleeves sliding in the arc elements in order to move along these to achieve said alteration of the position of the setting bolt to follow alterations in the extent of the wall plate. The sleeves are in this case secured axially in the arc elements. A locking nut is provided on each side of the arc element to serve as locking means for the setting bolt.

According to an alternative embodiment of the locking means for each setting bolt with a shoulder 38, the locking nut 37 may be replaced by other mechanical devices able, by means of tensile force, to force the shoulder of the setting bolt towards the arc element, or by pneumatic or hydraulic power transmission means providing the setting bolt with such tensile force.

According to a further embodiment of the invention the adjustment means 25 are mounted in sliding connection with the wall plate 5 and is attached to the support means so that they are fixed against movement in the circumference direction of the drum 6. In this case the adjustment means are adjustable in radial direction in order to set the connection beams in desired radial positions for corresponding adjustment of the distance of the wall plate from the drum. During operation of the material web will then exert a pressure on the wall plate so that this will be positioned against the connection beams and the desired distance from the envelope surface is obtained. Thus it is not necessary to pull the wall plate outwardly by means of the adjustment means. According to this embodiment the adjustment means advantageously may comprise pneumatic or hydraulic devices for adjusting the distance of the wall plate from the envelope surface of the drum by adjusting the connection beams to desired radial positions.

Instead of the wall plate shown it is possible to use a wall plate having rigid interval portions and flexible portions therebetween. Thus, it can be rigid on both sides of the connection beams 32 and flexible within a smaller portion between two connection beams. This may be obtained, for instance by means of groups of reinforcement strips or rods which are attached to the outer surface of the wall plate with the exception of their end portions which are free from attachment. The reinforcement strips of the one group have their free end portions located between the free end portions of the reinforcement strips of the other group so that the wall plate is flexible within the region of the free end portions of the reinforcement strips.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for treating a fiber suspension comprising: a drum rotatably journalled by a horizontal shaft to a stand and having an envelope surface for supporting a fiber web formed from a fiber suspension; wall means, concave in the direction to the envelope surface of the drum, and being spaced from the envelope surface to define a material space therebetween for the fiber web, the material space having an axial inlet gap and an axial outlet gap spaced from the inlet gap in the circumferential dimension; a plurality of adjusting means cooperating with the wall means for adjusting the spacing of the wall means from the envelope surface of the drum; and a support means joined to the stand for carrying the adjustment means, each of said adjustment means acting on and influencing a section of the wall means and comprising a connection element positioned at the outer surface of the wall means within said section; said wall means being continuous and enclosing a major portion of the envelope surface of the drum and being arranged to move freely in the circumferential dimension of the drum to compensate for radial alterations during adjustment of the spacing of the wall means from the envelope surface of the drum at one or more positions between the inlet gap and outlet gap, said adjustment means being attached to the wall means for movement together with said wall means in the circumferential dimension of the drum and free from said support means during the adjustment of the spacing of said wall means from said envelope surface of said drum, wherein each adjustment means comprises a plurality of setting devices each having a setting bolt arranged substantially radially to the drum, and locking means for detachable anchoring of said setting devices to said support means.

2. Apparatus according to claim 1, wherein the wall means encloses a sector angle α of at least about 270°.

3. Apparatus as recited in claim 2 wherein α equals at least about 300°.

4. Apparatus according to claim 1, wherein at the inlet gap the wall means is fixed against movement in the circumferential direction of the drum.

5. Apparatus according to claim 1, wherein two side edges of the wall means are arranged in sliding sealing contact with inner surfaces of gables arranged at the envelope surface of the drum, said gables rotate together with the drum and extend radially outwardly past the envelope surface at least as far as said wall means.

6. Apparatus according to claim 1, wherein said wall means consists essentially of a curved wall plate of sufficient strength to withstand pressure internally from the fiber suspension and the fiber web at the points between two adjacent connection elements, without becoming permanently deformed, and having sufficient elasticity to be shaped to a curvature with greater or smaller radius when influenced by the adjustment means.

7. Apparatus according to claim 1, wherein said locking means of said setting device comprises a shoulder permanently secured to the setting bolt and located immediately inside arc elements of the support means, spaced from the connection element, the bolt being screwed into or out of the connection element resulting in corresponding displacement of said wall means.

8. Apparatus according to claim 1, further comprising at least one liquid supply means, having at least one transverse row of channels, arranged in said wall means to supply liquid to the fiber web.

9. Apparatus for treating a fiber suspension comprising: a drum mounted for rotation about a substantially horizontal axis, and having an envelope surface for supporting a fiber web formed from a fiber suspension; a continuous curved wall means enclosing a major portion of said envelope surface and mounted for free movement in a circumferential dimension of the drum to compensate for radial alterations during adjustment of the spacing of said wall means from said envelope surface; said wall means being generally parallel to said envelope surface and being spaced therefrom to define a material space for the fiber web; said wall means comprising a curved wall plate having sufficient strength to withstand the internal pressure of the fiber suspension and the fiber web without becoming permanently deformed, and having sufficient elasticity to be shaped to a curvature with greater or smaller radius than its initial radius of curvature; and means for adjusting the spacing of said wall means from said envelope surface, said adjusting means comprising a plurality of adjustment devices, each adjustment device acting on and influencing a section, and only a section, of said wall means and including a connection element positioned at the outer surface of said wall means at said section, a support means stationary with respect to said drum and wherein each of said adjustment means is mounted in sliding connection with said wall means and is attached to said support means; and wherein said adjustment means each comprises a plurality of setting devices, each having a setting bolt arranged substantially radially to said drum, and locking means for detachably anchoring said setting devices to said support means.

10. Apparatus as recited in claim 9 wherein said wall means encloses a sector angle of at least about 270°.

11. Apparatus for treating a fiber suspension comprising: a drum rotatably journalled by a horizontal shaft to a stand and having an envelope surface for supporting a fiber web formed from a fiber suspension; wall means, concave in the direction to the envelope surface of the drum, and being spaced from the envelope surface to define a material space therebetween for the fiber web, the space having an axial inlet gap and an axial outlet gap spaced from the inlet gap in the circumferential dimension; a plurality of adjusting means cooperating with the wall means for adjusting the spacing of the wall means from the envelope surface of the drum; and a support means joined to the stand for carrying the adjustment means, each of said adjustment means acting on and influencing a section of the wall means and comprising a connection element positioned at the outer surface of the wall means within said section; said wall means being continuous and enclosing a major portion of the envelope surface of the drum and being arranged to move freely in the circumferential dimension of the drum to compensate for radial alterations during adjustment of the spacing of the wall means from the envelope surface of the drum at one or more positions between the inlet gap and outlet gap, and at least one tension means operatively fitted between said stand and said connection element of said adjustment means located closest to the axial outlet gap, said tension means being arranged to generate a tensile force in said wall means.

12. Apparatus according to claim 11, wherein said tension means comprises a threaded rod secured at one end portion to the support means, the other end portion being passed through the connection element to carry a tension nut cooperating therewith.

13. Apparatus as recited in claim 11 wherein the portion of said stand to which said tension means is operatively fitted comprises said support means.

14. Apparatus for treating a fiber suspension comprising: a drum mounted for rotation about a substantially horizontal axis, and having an envelope surface for supporting a fiber web formed from a fiber suspension; a continuous curved wall means enclosing a major portion of said envelope surface and mounted for free movement in a circumferential dimension of the drum to compensate for radial alterations during adjustment of the spacing of said wall means from said envelope surface; said wall means being generally parallel to said envelope surface and being spaced therefrom to define a material space for the fiber web; said wall means comprising a curved wall plate having sufficient strength to withstand the internal pressure of the fiber suspension and the fiber web without becoming permanently deformed, and having sufficient elasticity to be shaped to a curvature with greater or smaller radius than its initial radius of curvature; and means for adjusting the spacing of said wall means from said envelope surface, said adjusting means comprising a plurality of adjustment devices, each adjustment device acting on and influencing a section, and only a section, of said wall means and including a connection element positioned at the outer surface of said wall means at said section, said wall means enclosing a sector angle of at least about 270°; a support means stationary with respect to said drum; and wherein each of said adjustment means is mounted in sliding connection with said wall means and is attached to said support means; and wherein said adjustment means each comprises a plurality of setting devices, each having a setting bolt arranged substantially radially to said drum, and locking means for detachably anchoring said setting devices to said support means.

* * * * *